US008606670B2

(12) United States Patent
Patton (10) Patent No.: US 8,606,670 B2
(45) Date of Patent: Dec. 10, 2013

(54) INTEGRATED COMMUNICATION SOLUTION (75) Inventor: John M. Patton, Douglasville, GA (US)

(73) Assignee: First Data Corporation, Greenwood Village, CO (US)

(*) Notice: Subject to any disclaimer, the term of this patent is extended or adjusted under 35 U.S.C. 154(b) by 1509 days.

(21) Appl. No.: 11/619,023

(22) Filed: Jan. 2, 2007

(65) Prior Publication Data

US 2008/0162313 A1 Jul. 3, 2008

(51) Int. Cl.
G06Q 40/00 (2012.01)
G06Q 30/00 (2012.01)

(52) U.S. Cl.
USPC ......................................... 705/35; 705/14.17

(58) Field of Classification Search
USPC ........................................................ 705/1–28
See application file for complete search history.

(56) References Cited

U.S. PATENT DOCUMENTS

| 2,362,134 A | 11/1944 | Hoing |
| 3,717,337 A | 2/1973 | McCain et al. |
| 3,773,314 A | 11/1973 | Giovannini |
| 3,905,593 A | 9/1975 | Behn |
| 4,060,228 A | 11/1977 | Tress et al. |
| 4,256,955 A | 3/1981 | Giraud et al. |
| 4,321,672 A | 3/1982 | Braun et al. |
| 4,511,132 A | 4/1985 | Muller |
| 4,527,793 A | 7/1985 | Bottcher et al. |
| 4,577,848 A | 3/1986 | Hams |
| 4,634,107 A | 1/1987 | Vandersyde et al. |
| 4,643,705 A | 2/1987 | Bober |
| 4,697,246 A | 9/1987 | Zemke et al. |
| 4,700,055 A | 10/1987 | Kashkashian, Jr. |
| 4,718,657 A | 1/1988 | Otter et al. |
| 4,753,430 A | 6/1988 | Rowe et al. |
| 4,837,422 A | 6/1989 | Dethloff et al. |
| 4,900,903 A | 2/1990 | Wright et al. |
| 4,905,977 A | 3/1990 | Vijuk |
| 5,034,985 A | 7/1991 | Keough |
| 5,076,556 A | 12/1991 | Mandel |

(Continued)

FOREIGN PATENT DOCUMENTS

EP 621563 A1 10/1994

OTHER PUBLICATIONS

Author Unknown, HCL Infosystems to market Pitney Bowes electronic inserting, Dec. 14, 2000, www.financialexpress.com, 2 pages.

(Continued)

*Primary Examiner* — William A Brandenburg
(74) *Attorney, Agent, or Firm* — Kilpatrick Townsend & Stockton LLP (57) ABSTRACT Embodiments of the present invention provide methods, systems, and machine-readable media for integrating communications between multiple systems and/or processes related to different aspects of financial transactions of a consumer. Generally speaking, an integrated communications engine can be communicatively coupled with and adapted to manage communications between a plurality of routines or processes to manage interactions with a consumer throughout a lifecycle of a financial relationship with the consumer. According to one embodiment, the integrated communications engine can further comprise a rules engine. The rules engine can be adapted to monitor the plurality of routines, determine whether a condition specified in a rule is satisfied, and in response to determining that the condition is satisfied, trigger an action by one or more of the routines of the plurality of routines based on the rule.

26 Claims, 5 Drawing Sheets

(56) References Cited

U.S. PATENT DOCUMENTS

| | | |
|---|---|---|
| 5,082,268 A | 1/1992 | Santoro |
| 5,088,711 A | 2/1992 | Newsome |
| 5,125,214 A | 6/1992 | Orsinger et al. |
| 5,144,562 A | 9/1992 | Stikkelorum et al. |
| 5,155,342 A | 10/1992 | Urano |
| 5,171,005 A | 12/1992 | Manley et al. |
| 5,177,687 A | 1/1993 | Baggarly et al. |
| 5,220,770 A | 6/1993 | Szewczyk et al. |
| 5,231,569 A | 7/1993 | Myatt et al. |
| 5,264,665 A | 11/1993 | Delfer, III |
| RE34,483 E | 12/1993 | Bowman et al. |
| 5,283,829 A | 2/1994 | Anderson |
| 5,317,654 A | 5/1994 | Perry et al. |
| 5,327,701 A | 7/1994 | Dronsfield |
| 5,334,823 A | 8/1994 | Noblett |
| 5,357,563 A | 10/1994 | Hamilton et al. |
| 5,386,458 A | 1/1995 | Nair et al. |
| 5,388,815 A | 2/1995 | Hill et al. |
| 5,404,000 A | 4/1995 | Nair et al. |
| 5,428,210 A | 6/1995 | Nair et al. |
| 5,432,326 A | 7/1995 | Noblett, Jr. et al. |
| 5,479,530 A | 12/1995 | Nair et al. |
| 5,483,445 A | 1/1996 | Pickering |
| 5,500,513 A | 3/1996 | Langhans et al. |
| 5,510,997 A | 4/1996 | Hines et al. |
| 5,513,102 A | 4/1996 | Auriemma |
| 5,537,314 A | 7/1996 | Kanter |
| 5,590,038 A | 12/1996 | Pritod |
| 5,613,012 A | 3/1997 | Hoffman et al. |
| 5,614,703 A | 3/1997 | Martin et al. |
| 5,647,583 A | 7/1997 | Emigh et al. |
| 5,649,117 A | 7/1997 | Landry |
| 5,659,481 A | 8/1997 | Qutub et al. |
| 5,667,210 A | 9/1997 | DeLise, Jr. |
| 5,671,279 A | 9/1997 | Elgamal |
| 5,684,965 A | 11/1997 | Pickering |
| 5,704,602 A | 1/1998 | Taylor et al. |
| 5,709,374 A | 1/1998 | Taylor et al. |
| 5,710,887 A | 1/1998 | Chelliah et al. |
| 5,722,221 A | 3/1998 | Maltman et al. |
| 5,724,791 A | 3/1998 | Pishny et al. |
| 5,730,299 A | 3/1998 | Helsley |
| 5,745,590 A | 4/1998 | Pollard et al. |
| 5,754,434 A | 5/1998 | Delfer et al. |
| 5,777,883 A | 7/1998 | Lau et al. |
| 5,796,832 A | 8/1998 | Kawan |
| 5,812,668 A | 9/1998 | Weber |
| 5,818,724 A | 10/1998 | Brewster et al. |
| 5,850,446 A | 12/1998 | Berger et al. |
| RE36,116 E | 2/1999 | McCarthy |
| 5,873,072 A | 2/1999 | Kight et al. |
| 5,889,863 A | 3/1999 | Weber |
| 5,896,725 A | 4/1999 | Lundstrom et al. |
| 5,903,633 A | 5/1999 | Lorsch |
| 5,924,080 A | 7/1999 | Johnson |
| 5,936,221 A | 8/1999 | Corder et al. |
| 5,940,811 A | 8/1999 | Norris |
| 5,943,424 A | 8/1999 | Berger et al. |
| 5,950,179 A | 9/1999 | Buchanan et al. |
| 5,956,700 A | 9/1999 | Landry |
| 5,970,480 A | 10/1999 | Kalina |
| 5,983,196 A | 11/1999 | Wendkos |
| 5,983,208 A | 11/1999 | Haller et al. |
| 5,984,181 A | 11/1999 | Kreft |
| 5,987,132 A | 11/1999 | Rowney |
| 5,995,976 A | 11/1999 | Walker et al. |
| 5,999,596 A | 12/1999 | Walker et al. |
| 6,002,767 A | 12/1999 | Kramer |
| 6,026,379 A | 2/2000 | Haller et al. |
| 6,029,150 A | 2/2000 | Kravitz |
| 6,032,122 A | 2/2000 | Gertner et al. |
| 6,052,674 A | 4/2000 | Zervides et al. |
| 6,061,660 A | 5/2000 | Eggleston et al. |
| 6,061,665 A | 5/2000 | Bahreman |
| 6,064,994 A | 5/2000 | Kubatzki et al. |
| 6,072,870 A | 6/2000 | Nguyen et al. |
| 6,074,332 A | 6/2000 | Helmstadter et al. |
| 6,094,894 A | 8/2000 | Yates |
| 6,119,051 A | 9/2000 | Anderson et al. |
| 6,119,105 A | 9/2000 | Williams |
| 6,122,625 A | 9/2000 | Rosen |
| 6,128,599 A | 10/2000 | Walker et al. |
| 6,135,292 A | 10/2000 | Pettner |
| 6,138,911 A | 10/2000 | Fredregill et al. |
| 6,145,740 A | 11/2000 | Molano et al. |
| 6,149,056 A | 11/2000 | Stindon et al. |
| 6,164,043 A | 12/2000 | Miller et al. |
| 6,178,409 B1 | 1/2001 | Weber et al. |
| 6,202,005 B1 | 3/2001 | Mahaffey |
| 6,226,626 B1 | 5/2001 | Thiel |
| 6,246,996 B1 | 6/2001 | Stein et al. |
| 6,253,027 B1 | 6/2001 | Weber et al. |
| 6,266,575 B1 | 7/2001 | Anderson et al. |
| 6,267,366 B1 | 7/2001 | Graushar et al. |
| 6,273,411 B1 | 8/2001 | Vijuk |
| 6,276,677 B1 | 8/2001 | Hommochi et al. |
| 6,283,366 B1 | 9/2001 | Hills et al. |
| 6,298,336 B1 | 10/2001 | Davis et al. |
| 6,304,915 B1 | 10/2001 | Nguyen et al. |
| 6,308,887 B1 | 10/2001 | Korman et al. |
| 6,309,336 B1 | 10/2001 | Muessig et al. |
| 6,321,210 B1 | 11/2001 | O'Brien et al. |
| 6,327,348 B1 | 12/2001 | Walker et al. |
| 6,327,515 B1 | 12/2001 | Shea et al. |
| 6,330,544 B1 | 12/2001 | Walker et al. |
| 6,349,242 B2 | 2/2002 | Mahaffey |
| 6,373,950 B1 | 4/2002 | Rowney |
| 6,405,176 B1 | 6/2002 | Toohey |
| 6,449,616 B1 | 9/2002 | Walker et al. |
| 6,468,155 B1 | 10/2002 | Zucker et al. |
| 6,473,500 B1 | 10/2002 | Risafi et al. |
| 6,473,794 B1 | 10/2002 | Guheen et al. |
| 6,519,571 B1 | 2/2003 | Guheen et al. |
| 6,536,037 B1 | 3/2003 | Guheen et al. |
| 6,578,014 B1 | 6/2003 | Murcko, Jr. |
| 6,606,744 B1 | 8/2003 | Mikurak |
| 6,609,113 B1 | 8/2003 | O'Leary et al. |
| 6,615,166 B1 | 9/2003 | Guheen et al. |
| 6,623,415 B2 | 9/2003 | Gates et al. |
| 6,670,569 B2 | 12/2003 | Smith et al. |
| 6,671,818 B1 | 12/2003 | Mikurak |
| 6,704,714 B1 | 3/2004 | O'Leary et al. |
| 6,708,176 B2 | 3/2004 | Strunk et al. |
| 6,711,462 B2 | 3/2004 | Flores et al. |
| 6,714,835 B1 | 3/2004 | Hart et al. |
| 6,721,713 B1 | 4/2004 | Guheen et al. |
| 6,760,711 B1 | 7/2004 | Gillett et al. |
| 6,761,309 B2 | 7/2004 | Stoutenburg et al. |
| 6,779,319 B2 | 8/2004 | Smith et al. |
| 6,802,500 B2 | 10/2004 | Bennett et al. |
| 6,829,519 B2 | 12/2004 | Liberty et al. |
| 6,895,302 B2 | 5/2005 | Provost et al. |
| 7,013,289 B2 | 3/2006 | Horn et al. |
| 2001/0034720 A1 | 10/2001 | Armes |
| 2002/0082920 A1 | 6/2002 | Austin et al. |
| 2002/0095387 A1 | 7/2002 | Sosa et al. |
| 2002/0103746 A1 | 8/2002 | Moffett et al. |
| 2002/0120846 A1 | 8/2002 | Stewart et al. |
| 2003/0115160 A1 | 6/2003 | Nowlin |
| 2003/0163440 A1 | 8/2003 | Tonack |
| 2003/0208442 A1* | 11/2003 | Cockrill et al. .................. 705/40 |
| 2003/0212620 A1 | 11/2003 | Holm-Blagg |
| 2003/0212629 A1 | 11/2003 | King |
| 2003/0236728 A1 | 12/2003 | Sunderji et al. |
| 2004/0139004 A1 | 7/2004 | Cohen et al. |
| 2004/0148239 A1 | 7/2004 | Albee et al. |
| 2004/0204789 A1 | 10/2004 | Provost et al. |
| 2005/0102203 A1 | 5/2005 | Keong |
| 2005/0289024 A1 | 12/2005 | Hahn-Carlson et al. |
| 2006/0229937 A1* | 10/2006 | Manley ........................... 705/14 |

(56) References Cited

U.S. PATENT DOCUMENTS

2008/0010198 A1* 1/2008 Eliscu ............................ 705/40
2012/0010934 A1* 1/2012 Walker et al. .............. 705/14.17

OTHER PUBLICATIONS

Author Unknown, Pitney Bowes exibits low and mid range products at IDMF, Mar. 2002, www.pitneybowes.co.uk., 3 pages.
First Data DecisionQuest™ Service, First Data Resources Inc., pp. 1-364.
Hay, David, et al., "Defining Business Rules—What Are They Really?" (The Business Rules Group, formerly known as the GUIDE Business Rules Project) Final Report, Revision 3, Jul. 2000.
Internet, Pitney Bowes, Direct Connect™ Inserter Control System, http://www.pb.com, Apr. 5, 2002, 1 page.
Internet, Pitney Bowes, DM 9 Series Inserting System, http://www.pb.com, Apr. 5, 2002, 1 page.
Internet, Pitney Bowes, Production Mail Inserters, http://www.pb.com, Apr. 5, 2002, 2 pages.
Internet, Pitney Bowes, 5 Series Desktop Inserting System, http://www.pb.com, Apr. 5, 2002, 1 page.

* cited by examiner

INTEGRATED COMMUNICATION SOLUTION

CROSS-REFERENCES TO RELATED APPLICATIONS

This application is related to the following commonly-owned applications (the "Related Applications"), of which the entire disclosure of each is incorporated herein by reference, as if set forth in full in this document, for all purposes: U.S. patent application Ser. No. 10/271,875 filed Oct. 15, 2002 and entitled "Rules Management Systems and Methods"; U.S. patent application Ser. No. 11/152,040 filed Jun. 13, 2005 and entitled "Strategic Communications Systems and Methods"; U.S. patent application Ser. No. 11/371,165 filed on Mar. 7, 2006 and entitled "Communication Point Delivery Instructions"; U.S. patent application Ser. No. 10/972,172, filed on Oct. 22, 2004 and entitled "System For Maintaining Communication Point Data" a continuation-in-part of U.S. patent application Ser. No. 10/971,831, filed on Oct. 22, 2004, entitled "System For Maintaining Party And Communication Point Data," and a continuation-in-part of U.S. patent application Ser. No. 10/972,093, filed on Oct. 22, 2004, entitled "System For Maintaining Party Data"; U.S. Patent Application No. 60/547,651, filed on Feb. 24, 2004, entitled "System And Method For Transaction Processing"; U.S. Patent Application No. 60/567,891, filed May 3, 2004, entitled "System And Method For Transaction Processing"; U.S. patent application Ser. No. 11/115,079, entitled "Auction Systems and Methods for Selecting Inserts for Direct Mailings," filed on Apr. 25, 2005; and U.S. patent application Ser. No. 10/655,818, entitled "Systems and Methods for Allocating Excess Space Associated With Mailings," filed on Sep. 5, 2003; which is a Continuation-in-Part of U.S. patent application Ser. No. 10/417,887, entitled "Systems for Assembling Mailings and Methods for External Control Thereof," filed on Apr. 14, 2003 U.S. patent application Ser. No. 10/029,122, entitled "Sheet Folding Systems & Methods" filed on Dec. 21, 2001; U.S. patent application Ser. No. 10/045,589, entitled "System And Methods Of Providing Inserts Into Envelopes", and filed Nov. 8, 2001; U.S. patent application Ser. No. 10/036,653, entitled "Mail Handling Equipment And Methods", and filed Nov. 8, 2001; U.S. patent application Ser. No. 10/028,449 entitled "Real-Time Intelligent Packet-Collation Systems and Methods", and filed on Dec. 19, 2001; U.S. patent application Ser. No. 10/028,888, entitled "Weight Measuring Systems & Methods", and filed on Dec. 19, 2001; and U.S. patent application Ser. No. 10/232,045, entitled "Weight Measuring Systems & Methods For Weighing Items", and filed on Aug. 29, 2002.

BACKGROUND OF THE INVENTION

Embodiments of the present invention relate generally to managing interactions with a consumer. More specifically, embodiments of the present invention relate to methods and systems for integrating communications between multiple systems and/or processes related to different aspects of financial transactions of the consumer.

During a typical consumer financial transaction, such as, for example, a purchase using a credit card, a number of different systems and processes handle or process data related to the consumer and/or the transaction. For example, a financial institution providing or issuing the credit card to the consumer can have one or more systems executing processes for recording the transaction, paying a merchant for the consumer's purchase, billing the consumer, etc. Other systems and/or processes may also be utilized at different times or upon the occurrence of different events through the span of the consumer's relationship with the financial institution. For example, various other processes and/or systems may be involved in handling opening of an account and/or issuance of a credit card or other instrument, activation of the card, renewal of the account or card, generation and/or printing of a statement of the account, etc.

However, these systems and/or processes consist of individual, stand-alone processes. That is, these processes do not interact and/or share data about the customer or transaction of the consumer or, at best, have very limited interaction. If these processes interact at all, it is by saving transaction data in one or more shared databases that may or may not be used by other processes. There is currently no management or oversight of interaction between these processes and/or systems.

Because of this limited interaction between the systems and/or processes handling different aspects of the financial transactions related to the consumer, the various individual systems and/or processes are blind to or unaware of the other processes and events occurring related to the consumer. As a result, significant marketing opportunities are lost.

Hence, there is a need for improved methods and systems for integrating communications between multiple systems and/or processes related to different aspects of financial transactions of a consumer.

BRIEF SUMMARY OF THE INVENTION

Methods, systems, and machine-readable media are disclosed for integrating communications between multiple systems and/or processes related to different aspects of financial transactions of a consumer. According to one embodiment, a system can comprise a communications network and one or more computers communicatively coupled with the communications network. The one or more computers can be adapted to execute a plurality of routines. Each routine of the plurality of routines can process different aspects of one or more financial transactions of a consumer.

For example, the plurality of routines can comprise a strategic communications routine. The strategic communications routine can be adapted to manage correspondences to the consumer, for example, during generation of a statement of financial transactions for the consumer. In another example, the plurality of routines can comprise an access device routine, the access device routine can be adapted to manage processing of physical tokens of a financial account of the consumer. The plurality of routines can additionally or alternatively comprise a two-way communications routine. The two-way communications routine can be adapted to manage communications with the consumer. In another example, the plurality of routines can comprise an Item Level Processing (ILP) routine. The ILP routine can be adapted to manage actions related to individual goods or services purchased by the consumer. The plurality of routines can additionally or alternatively comprise a broker routine. The broker routine can be adapted to manage communications between a third-party advertiser and the consumer. In still another example, the plurality of routines can comprise an e-messenger routine. The e-messenger routine can be adapted to manage generation and delivery of electronic statements of financial transactions for the consumer and other electronic communications such as cell phone calls, pager alerts, emails, etc.

An integrated communications engine can be communicatively coupled with the communications network. The integrated communications engine can be adapted to manage communications between the plurality of routines to manage interactions with the consumer throughout a lifecycle of a financial relationship with the consumer. According to one embodiment, the integrated communications engine can further comprise a rules engine. The rules engine can be adapted to monitor the plurality of routines, determine whether a condition specified in a rule is satisfied, and in response to determining that the condition is satisfied, trigger an action by one or more of the routines of the plurality of routines based on the rule. Additionally or alternatively, the integrated communications engine can further comprise an Application Program Interface (API). The API can provide for interaction between the integrated communications engine and the plurality of routines.

The system can further comprise a plurality of data stores communicatively coupled with the communications network. The plurality of data stores can include, for example, a data link data store. The data link data store can have stored therein information related to the consumer and/or the transaction and used by one or more of the routines to handle different aspects of the transaction. In another example, the plurality of data stores can include an operational data store. The operational data store can have stored therein information related to activity on one or more financial accounts of the consumer. Additionally or alternatively, the plurality of data stores can include a marketing data store. The marketing data store can have stored therein marketing information from a financial institution maintaining one or more financial accounts for the consumer. In another example, the plurality of data stores can include a third-party data store. The third-party data store can have stored therein marketing information provided by one or more third-party advertisers or vendors. In yet another example, the plurality of data stores can include a merchant masterfile data store. The merchant masterfile data store can have stored therein information related to details of the transaction such as a SKU number of an item purchased, the price, etc.

According to another embodiment of the present invention, a system can comprise a communications network and one or more computers communicatively coupled with the communications network. The one or more computers can be adapted to execute a plurality of merchant processes. Each merchant process of the plurality of merchant processes can be adapted to process different aspects of a financial transaction of a consumer on behalf of a merchant that is party to the financial transaction of the consumer. The one or more computers can also be adapted to execute a plurality of issuer processes. Each issuer process of the plurality of issuer processes can be adapted to process different aspects of the financial transaction of the consumer on behalf of an issuing financial institution of an instrument used by the consumer in the financial transaction.

For example, one of the merchant processes and/or one of the issuer processes can comprise a strategic communications process. The strategic communications process can be adapted to manage correspondences to the consumer during generation of letters, statements of financial transactions for the consumer, etc. In another example, one of the merchant processes and/or one of the issuer processes can comprise a plastics process. The plastics process can be adapted to manage processing of physical tokens of a financial account of the consumer. Additionally or alternatively, one of the merchant processes and/or one of the issuer processes can comprise a two-way communications process. The two-way communications process can be adapted to manage communications with the consumer. In another example, one of the merchant processes and/or one of the issuer processes can comprises an Item Level Processing (ILP) process. The ILP process can be adapted to manage actions related to individual goods or services purchased by the consumer. In yet another example, one of the merchant processes and/or one of the issuer processes can comprise a broker process. The broker process can be adapted to manage communications between a third-party advertiser and the consumer. Additionally or alternatively, one of the merchant processes and/or one of the issuer processes can comprise an e-messenger process. The e-messenger process can be adapted to manage generation and delivery of electronic statements of financial transactions for the consumer.

The system can also comprise a plurality of data stores communicatively coupled with the communications network. The plurality of data stores can include, for example, a data link data store. The data link data store can have stored therein information related to the consumer and/or the transaction and used by one or more of the routines to handle different aspects of the transaction. Additionally or alternatively, the plurality of data stores can include an operational data store. The operational data store can have stored therein information related to activity on one or more financial accounts of the consumer. In another example, the plurality of data stores can include a marketing data store. The marketing data store can have stored therein marketing information from the issuing financial institution. Additionally or alternatively, the plurality of data stores can include a third-party data store. The third-party data store can have stored therein marketing information provided by one or more third-party advertisers or vendors. In yet another example, the plurality of data stores can include a merchant masterfile data store. The merchant masterfile data store can have stored therein information related to details of the transaction such as a SKU number of an item purchased, the price, etc.

An integrated communications engine can be communicatively coupled with the communications network. The integrated communications engine can be adapted to manage communications between the plurality of merchant processes and the plurality of issuer processes to manage interactions with the consumer throughout a lifecycle of a financial relationship between the issuing financial institution and the consumer based on information in the plurality of data stores and actions of the plurality of merchant processes and the plurality of issuer processes. According to one embodiment, the integrated communications engine can further comprise a rules engine. The rules engine can be adapted to monitor the plurality of merchant processes and the plurality of issuer processes, determine whether a condition specified in a rule is satisfied, and in response to determining that the condition if satisfied, trigger an action by one or more of the merchant processes or one or more of the issuer processes based one the rule. Additionally or alternatively, the integrated communications engine can further comprise an Application Program Interface (API). The API can provide for interaction between the integrated communications engine, the plurality of merchant processes and the plurality of issuer processes.

According to yet another embodiment, a method of managing interactions with a consumer through a lifecycle of a financial relationship between the consumer and a financial institution maintaining one or more accounts for the consumer can comprise monitoring a plurality of processes for managing different aspects of financial transactions of the consumer related to the one or more accounts. For example, the plurality of processes can comprise a strategic communications process. The strategic communications process can be adapted to manage correspondences to the consumer during generation of letters, statements of financial transactions for the consumer, etc. In another example, the plurality of processes can comprise a plastics process. The plastics process can be adapted to manage processing of physical tokens of a financial account of the consumer. Additionally or alternatively, the plurality of processes can comprise a two-way communications process. The two-way communications process can be adapted to manage communications with the consumer. In yet another example, the plurality of processes can comprise an Item Level Processing (ILP) process. The ILP process can be adapted to manage actions related to individual goods or services purchased by the consumer. Additionally or alternatively, the plurality of processes can comprise a broker process. The broker process can be adapted to manage communications between a third-party advertiser and the consumer. In still another example, the plurality of processes can comprise an e-messenger process. The e-messenger process can be adapted to manage generation and delivery of electronic statements of financial transactions for the consumer.

A determination can be made as to whether a condition specified in a rule is satisfied by at least a first process of the plurality of processes. In response to determining that the condition is satisfied, a second process of the plurality of processes can be triggered to perform an action specified by the rule. According to one embodiment, determining whether the condition is satisfied can be further based on information stored in one or more of a plurality of data stores. For example, the plurality of data stores can include a data link data store. The data link data store can have stored therein information related to the consumer and/or the transaction and used by one or more of the routines to handle different aspects of the transaction. In another example, the plurality of data stores can include an operational data store. The operational data store can have stored therein information related to activity on one or more financial accounts of the consumer. Additionally or alternatively, the plurality of data stores can include a marketing data store. The marketing data store can have stored therein marketing information from a financial institution maintaining one or more financial accounts for the consumer. In yet another example, the plurality of data stores can include a third-party data store. The third-party data store can have stored therein marketing information provided by one or more third-party advertisers. In still another example, the plurality of data stores includes a merchant masterfile data store. The merchant masterfile data store can have stored therein information related to details of the transaction such as a SKU number of an item purchased, the price, etc.

DETAILED DESCRIPTION OF THE INVENTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Embodiments of the invention provide methods and systems for integrating communications between multiple systems and/or processes related to different aspects of financial transactions of a consumer. In some such embodiments, the processes are executed by an entity on behalf of one or more client organizations. The description below sometimes provides illustrations that use an example where a client organization is a financial institution, but there is no such requirement for the invention and the methods are intended also to be applicable to other types of organizations that make use of large collections of data. For example, embodiments of the invention may also be used for managing health-care documents or information.

The description herein sometimes refers to "clients" and to "customers." Reference to "clients" is intended to refer to persons, i.e. individuals, entities, or their agents, on whose behalf a set of information is managed. Reference to "customers" or "consumer" is intended to refer to persons, i.e. individuals, entities, or their agents, who are the subject of or related to that information. Thus, merely for purposes of illustration, in the case where the information comprises credit-card account records for a credit card issued to Mr. Jones by Bank A, Bank A corresponds to a client and Mr. Jones corresponds to a customer or consumer.

Embodiments of the present invention provide methods, systems, and machine-readable media for integrating communications between multiple systems and/or processes related to different aspects of financial transactions of a consumer. Generally speaking, an integrated communications engine can be communicatively coupled with and adapted to manage communications between a plurality of routines or processes to manage interactions with a consumer throughout a lifecycle of a financial relationship with the consumer. According to one embodiment, the integrated communications engine can further comprise a rules engine. The rules engine can be adapted to monitor the plurality of routines, determine whether a condition specified in a rule is satisfied, and in response to determining that the condition is satisfied, trigger an action by one or more of the routines of the plurality of routines based on the rule.

Figure 1:
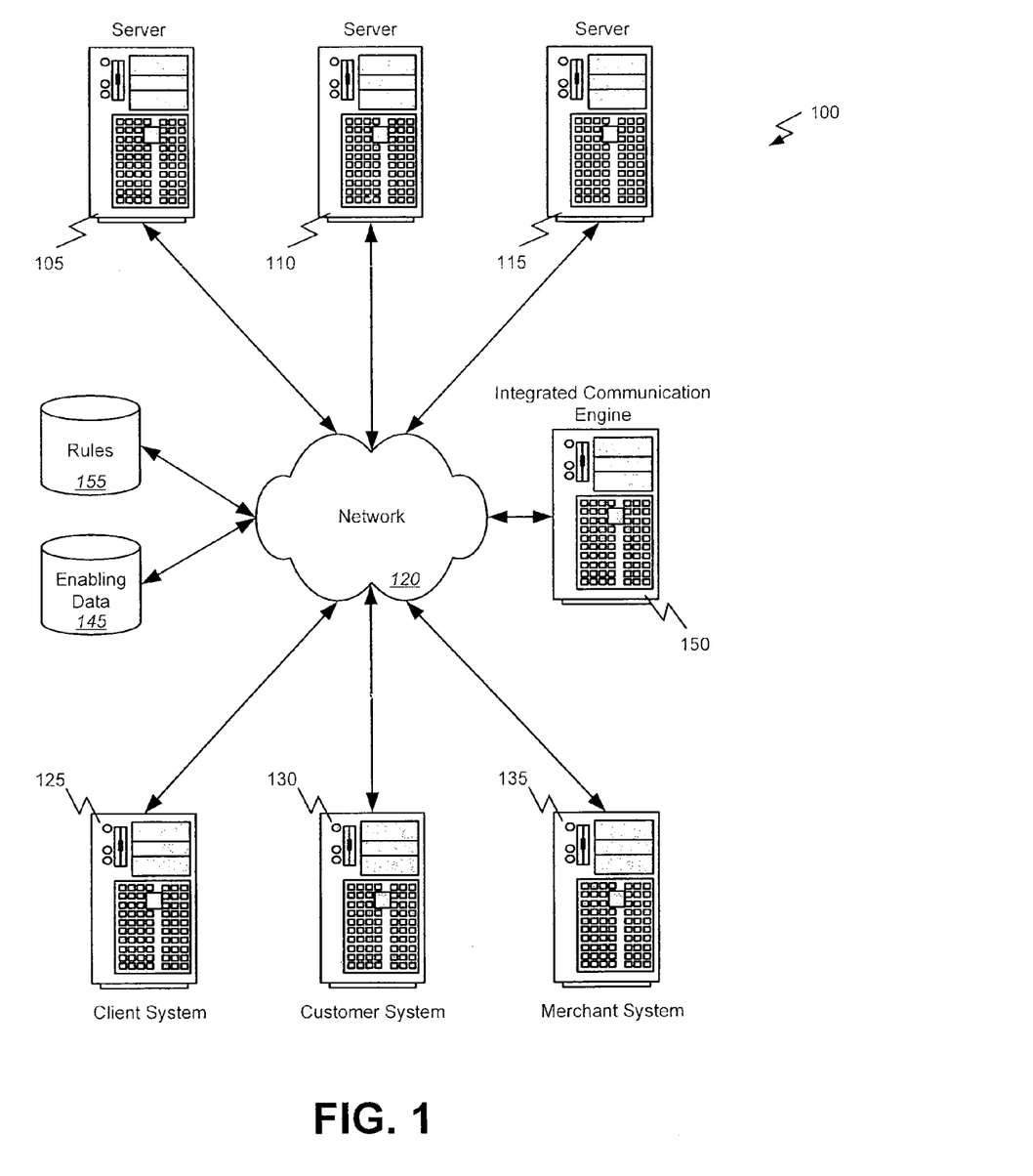
FIG. 1 is a block diagram illustrating an exemplary environment in which embodiments of the present invention may be implemented.

FIG. 1 is a block diagram illustrating an exemplary environment in which embodiments of the present invention may be implemented. In this example, the system can include one or more server computers 105, 110, 115 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to execute a plurality of processes related to financial transactions of one or more consumers on behalf of one or more client financial institutions. For example, one or more of the servers 105, 110, 115 may execute one or more processes for recording transactions on a credit card issued to the consumer by the financial institution. Other processes may provide for, paying a merchant for the consumer's purchase, billing the consumer, etc The applications can also include any number of applications for controlling access to resources of the servers 105, 110, 115.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5G, CDMA, CDMA2000, WCDMA, EVDO etc.

The system 100 can include one or more user computers which may be used to operate a client, whether a dedicate application, web browser, etc. For example, the user computers can include a client system 125 operated by a client financial institution, a customer system 130 operated by a customer or consumer, a merchant system 135 operated by a merchant or vendor, etc. The user computers 125, 130, 135 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 125, 130, 135 may also have any of a variety of applications, including one or more development systems, database client and/or server applications, and web browser applications. Alternatively, the user computers 125, 130, 135 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with three user computers, any number of user computers may be supported.

The system 100 may also include one or more databases or repositories of enabling data 145 and a rule base 155. The database(s) of enabling data 145 and the rule base 155 may reside in a variety of locations. By way of example, a database 145 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 145 may be a relational database that is adapted to store, update, and retrieve data in response to SQL-formatted commands. As will be discussed in detail below, the repository of enabling data 145 can include a wide variety of information related to financial transactions related to the consumer and/or specified by different entities such as merchants, financial institutions, third-party advertisers, etc. The rule base can include a set of rules, i.e., predefined combinations of conditions and actions, that can be used to integrate communications between the various components of the system 100.

The system 100 can also include an integrated communications engine 150 communicatively coupled with the communications network 120. As will be discussed in detail below, the integrated communications engine 150 can be adapted to manage communications between the plurality of computers 105, 110, 115, 125, 130, 135 and/or process executing thereon to manage interactions with a consumer throughout a lifecycle of a financial relationship between a client financial institution and the consumer. According to one embodiment, the integrated communications engine 150 can further comprise a rules engine. The integrated communications engine 150, via the rules engine and in combination with the repository of enabling data 145 and/or the rules base 155, can be adapted to monitor the plurality of routines, determine whether a condition specified in a rule is satisfied, and in response to determining that the condition is satisfied, trigger an action by one or more of the routines of the plurality of routines executing on the computers 105, 110, 115, 125, 130, 135 based on the rule.

Figure 2:
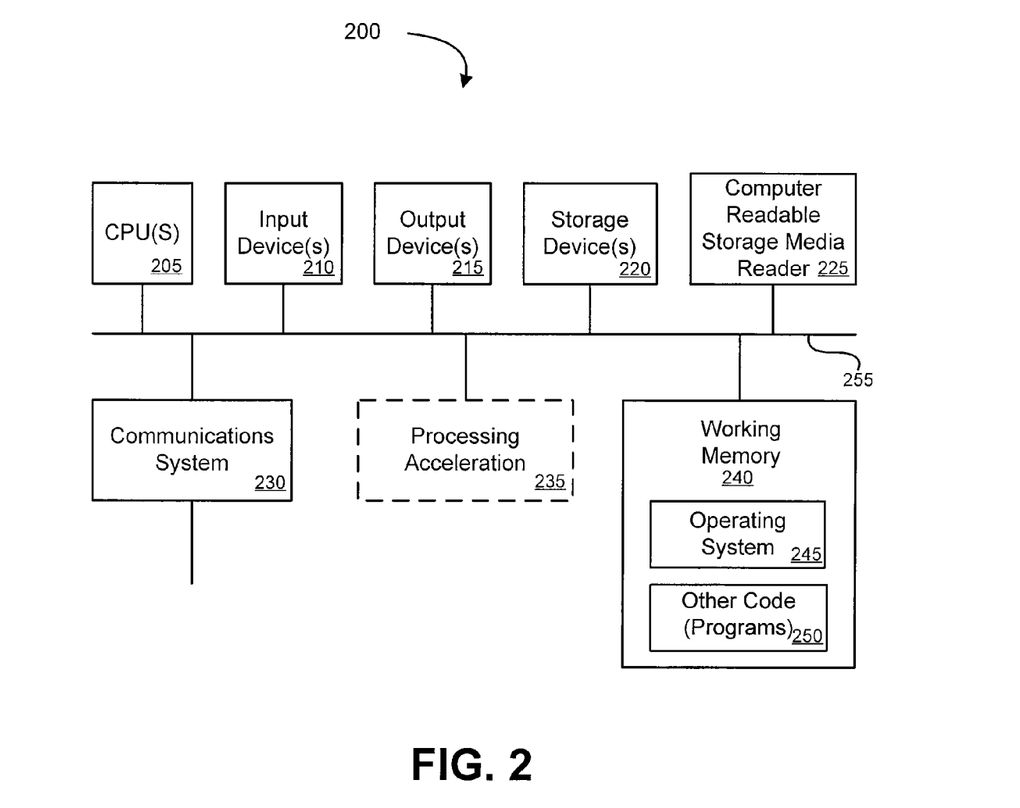
FIG. 2 is a block diagram illustrating an exemplary computer system upon which embodiments of the present invention may be implemented.

FIG. 2 is a block diagram illustrating an exemplary computer system upon which various elements of the exemplary environment illustrated in FIG. 1 may be implemented. The computer system 200 is shown comprising hardware elements that may be electrically coupled via a bus 255. The hardware elements may include one or more central processing units (CPUs) 205; one or more input devices 210 (e.g., a scan device, a mouse, a keyboard, etc.); and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225; a communications system 230 (e.g., a modem, a network card (wireless or wired), an infra-red communication device, etc.); and working memory 240, which may include RAM and ROM devices as described above communicatively coupled with and readable by CPU(s) 205. In some embodiments, the computer system 200 may also include a processing acceleration unit 235, which can include a DSP, a special-purpose processor and/or the like.

The computer-readable storage media reader 225 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with a network and/or any other computer or other type of device.

The computer system 200 may also comprise software elements, shown as being currently located within a working memory 240, including an operating system 245 and/or other code 250, such as an application program. The application programs may implement the methods of the invention as described herein. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Figure 3:
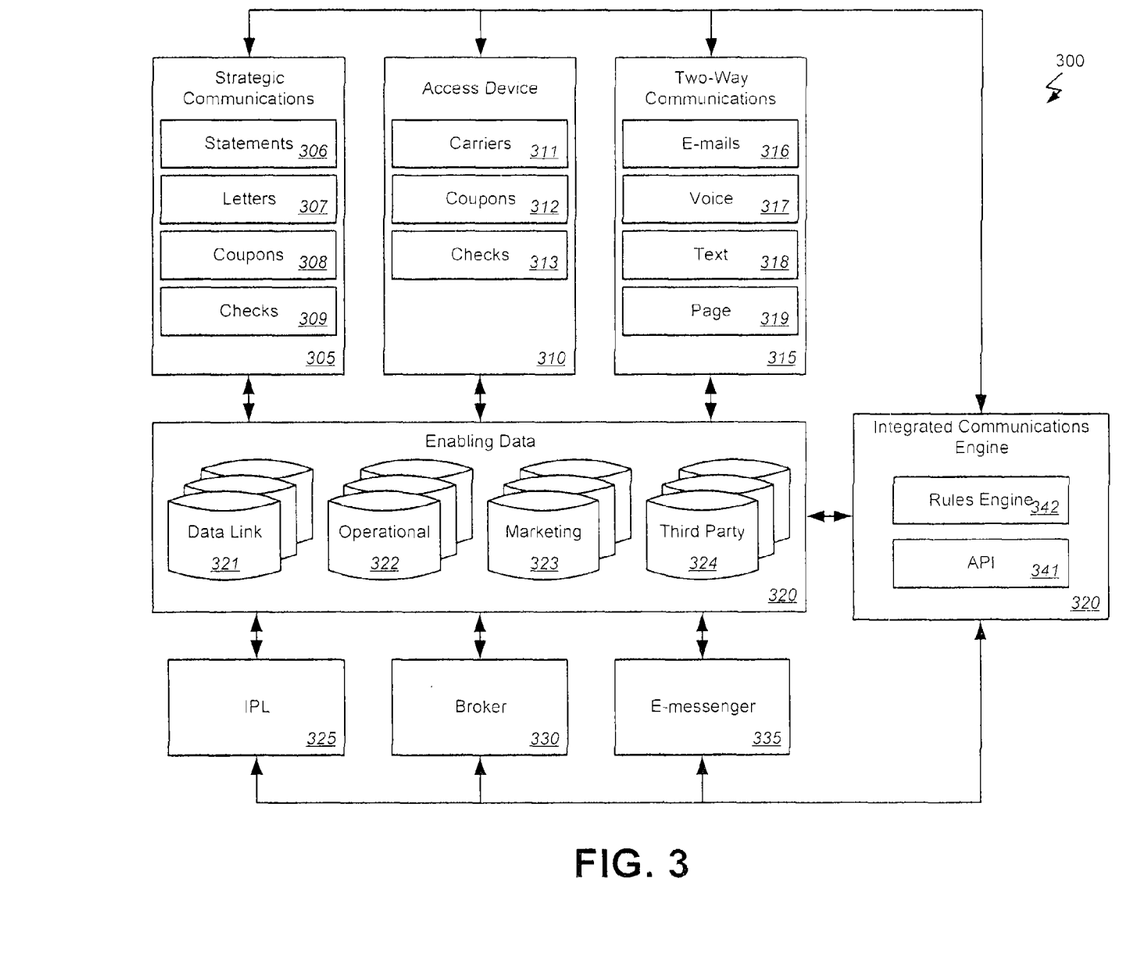
FIG. 3 is a block diagram illustrating functional components of a system for providing integrated communications between multiple systems and/or processes related to different aspects of financial transactions of a consumer according to one embodiment of the present invention.

FIG. 3 is a block diagram illustrating functional components of a system for providing integrated communications between multiple systems and/or processes related to different aspects of financial transactions of a consumer according to one embodiment of the present invention. In this example, the system 300 includes a plurality of routines or processes 305, 310, 315, 325, 330, and 335 that may be executed by one or more computers such as servers 105, 110, 115 described above with reference to FIG. 1. Each routine of the plurality of routines 305, 310, 315, 325, 330, and 335 can process different aspects of one or more financial transactions of a consumer.

The plurality of routines can comprise a strategic communications routine 305 such as described, for example, in the related application entitled "Strategic Communications Systems and Methods" and others cross-referenced above. Generally speaking the strategic communications routine 305 can be adapted to manage correspondences to the consumer during generation of a statement of financial transactions for the consumer. As such, the strategic communications routine 305 can include processes, routines, modules, etc for handling or processing statements 306 to the consumer. The strategic communications routine 305 can also provide for generating and/or sending letters 307 and/or coupons 308 to the consumer. The strategic communications routine 305 can also be adapted to generate or manage checks 309, such as promotional, refund, or other checks to the consumer as described in the related application. So, for example, the strategic communications routine can be adapted to include a number of advertisement or promotional materials with a consumer's regular account statement.

The plurality of routines can also comprise an access device routine 310 as described in the applications cross referenced above. The access device routine 310 can be adapted to manage processing of physical tokens of a financial account of the consumer, e.g., credit cards, gift cards, electronic devices such as fobs or other devices, etc. For example, the access device routine 310 may be adapted to handle generation and delivery of credit cards through one of more carriers 311. The access device routine 310 can also provide for generating and/or sending coupons 312 to the consumer as well as generating or managing checks 313, such as promotional, refund, or other checks with new cars sent to the consumer or based on the occurrence of some event related to the card such as renewal, cancellation, etc.

The plurality of routines can additionally or alternatively comprise a two-way communications routine 315. The two-way communications routine can be adapted to manage communications with the consumer. For example, the two-way communications routine 315 can be adapted to provide an email 316, voice 317, text 318, electronic page 319, or other type of message to a consumer at a specified time or one the occurrence of some event. For example, the two-way communications routine 315 can be adapted to generate one or more emails to advertise a particular item, merchant, promotion, etc and deliver the emails to specified consumers.

Additionally or alternatively, the plurality of routines can comprise an Item Level Processing (ILP) routine 325. The ILP routine 325 can be adapted to manage actions related to individual goods or services purchased by the consumer. For example, the ILP routine 325 can be adapted to generate advertising or promotional material related to a particular good, e.g., discounts on complementary goods, etc.

The plurality of routines can additionally or alternatively comprise a broker routine 330 such as, for example, a routine as described in the related application entitled "Systems and Methods for Allocating Excess Space Associated with Mailings" and others cross-referenced above. The broker routine 330 can be adapted to manage communications between a third-party advertiser and the consumer. For example, the broker routine 330 can be adapted to receive, manage, print, etc advertisements on or with a consumer's statement or other communications to the consumer.

The plurality of routines can also comprise an e-messenger routine 335. The e-messenger routine 335 can be adapted to manage generation and delivery of electronic statements of financial transactions for the consumer.

An integrated communications engine 320 can be communicatively coupled with the communications network. The integrated communications engine 320 can be adapted to manage communications between the plurality of routines 305, 310, 315, 325, 330, and 335 to manage interactions with the consumer throughout a lifecycle of a financial relationship with the consumer. So, through the integrated communication engine 320, the system 300 can coordinate the communications of the strategic communications routine 305 with those of the two-way communications routine 315 and/or broker routine 330 to provide more effective, coordinated marketing or advertising based on the occurrence of some event related to a consumer's transactions. For example, in the event that the consumer purchases a particular good, advertisements for a complimentary good can be generated and send to the consumer.

According to one embodiment, the integrated communications engine 320 can further comprise a rules engine 342. The rules engine 342 can be maintained and managed, for example, in accordance with the related application entitled "Rules Management Systems and Methods" and others cross-referenced above. The rules engine 342 can be adapted to monitor the plurality of routines 305, 310, 315, 325, 330, 335, determine whether a condition specified in a rule is satisfied, and in response to determining that the condition is satisfied, trigger an action by one or more of the routines of the plurality of routines 305, 310, 315, 325, 330, 335 based on the rule. More specifically, the rules engine 342 can be adapted to maintain a rule base such as rule base 155 discussed above with reference to FIG. 1. As noted above, the rule base can comprise a series of rules made up of sets of conditions and corresponding actions. For example, a rule may specify that, upon the purchase of a particular good, a specific advertisement should be included in the consumer's next statement by the strategic communications routine 305 and an email should be generated and sent to the consumer by the two-way communications routine 315.

Additionally or alternatively, the integrated communications engine 320 can further comprise an Application Program Interface (API) 341. The API 341 can provide for interaction between the integrated communications engine 320 and the plurality of routines 305, 310, 315, 325, 330, 335. For example, the API 320 can provide a number of methods, i.e., routines, that's can be used by the integrated communications engine to monitor the plurality of routines 305, 310, 315, 325, 330, 335, trigger an action or actions by the routines 305, 310, 315, 325, 330, 335 or receive information from the routines 305, 310, 315, 325, 330, 335.

The system 300 can further comprise a plurality of data stores 320 communicatively coupled with the communications network. The plurality of data stores 320 can include, for example, a data link data store 321. The data link data store 321 can have stored therein information related to the consumer and/or the transaction and used by one or more of the routines to handle different aspects of the transaction. In another example, the plurality of data stores 320 can include an operational data store 322. The operational data store 322 can have stored therein information related to activity on one or more financial accounts of the consumer. Additionally or alternatively, the plurality of data stores 320 can include a marketing data store 323. The marketing data store 323 can have stored therein marketing information from a financial institution maintaining one or more financial accounts for the consumer. In another example, the plurality of data stores 320 can include a third-party data store 324. The third-party data 324 store can have stored therein marketing information provided by one or more third-party advertisers or vendors. That is, the third-party data store 324 can have stored therein information provided by a party other than the merchant or the issuing financial institution and used, perhaps in exchange for a fee, for marketing or advertising for that party.

Therefore, in use, the integrated communications engine 320 monitors the plurality of processes 305, 310, 315, 325, 330, 335 through the API 341 and/or plurality of data stores 320 to determine if a condition of a rule specified in the rule base has been satisfied. Upon satisfaction of a rule, the integrated communications engine 320 triggers the corresponding action(s) specified in the rule. So, for example, a rule may specify that, upon sending a new credit card, a phone message should be sent to the recipient to remind him to activate the card upon receipt. So, when the integrated communications engine 320 detects that the access device routine has generated and sent a new card to a consumer, the integrated communications engine 320 can trigger the two-way communications routine 315 to generate the corresponding phone message to the consumer.

Figure 4:
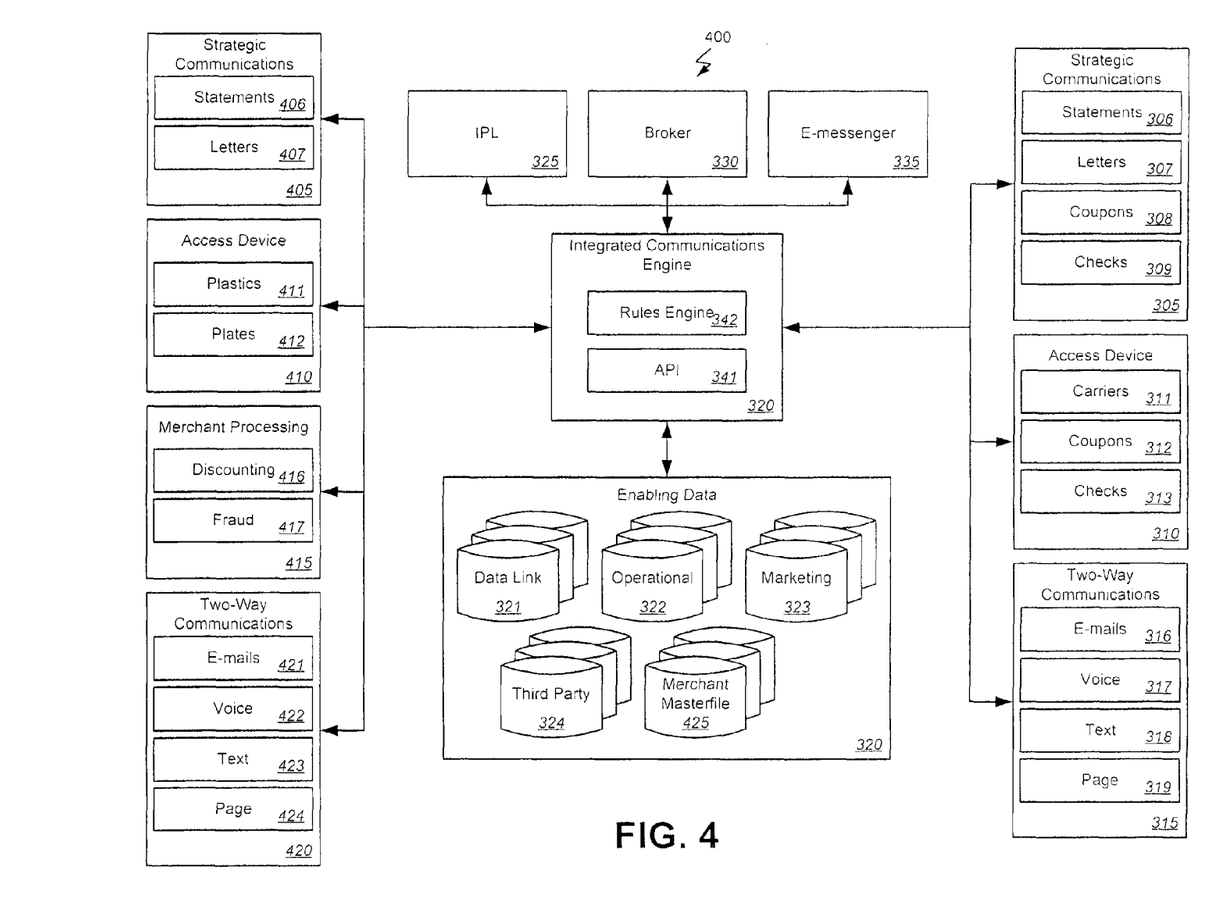
FIG. 4 is a block diagram illustrating functional components of a system for providing integrated communications between multiple systems and/or processes related to different aspects of financial transactions of a consumer according to an alternative embodiment of the present invention.

FIG. 4 is a block diagram illustrating functional components of a system for providing integrated communications between multiple systems and/or processes related to different aspects of financial transactions of a consumer according to an alternative embodiment of the present invention. In this example, the system 400 includes a plurality of merchant processes 405-420 as well as a plurality of issuer processes 305-315. That is, the processes executed on the one or more servers as described above can be organized into merchant processes 405-420 and issuer processes 305-315. According to one embodiment, each merchant process of the plurality of merchant processes 405-420 can be adapted to process different aspects of a financial transaction of a consumer on behalf of a merchant that is party to the financial transaction of the consumer. Each issuer process of the plurality of issuer processes 305-315 can be adapted to process different aspects of the financial transaction of the consumer on behalf of an issuing financial institution of an instrument used by the consumer in the financial transaction.

For example, one of the merchant processes and/or one of the issuer processes can comprise a strategic communications process 405 and 305. The strategic communications process 405 and 305 can be adapted to manage correspondences to the consumer during generation of a statement of financial transactions for the consumer. Generally speaking the strategic communications routine 405 and 305 can be adapted to manage correspondences to the consumer during generation of a statement of financial transactions for the consumer. As such, the strategic communications routine 405 and 305 can include processes, routines, modules, etc for handling or processing statements 406 and 306 to the consumer. The strategic communications routine 405 and 305 can also provide for generating and/or sending letters 407 and 307 and/or coupons 308 to the consumer. The strategic communications routine 305 can also be adapted to generate or manage checks 309, such as promotional, refund, or other checks to the consumer as described in the related application. So, for example, the strategic communications routine can be adapted to include a number of advertisement or promotional materials with a consumer's regular account statement.

One of the merchant processes and/or one of the issuer processes can comprise a plastics process 410 and 310. The plastics process 410 and 310 can be adapted to manage processing of physical tokens of a financial account of the consumer. The access device routine 410 and 310 can be adapted to manage processing of physical tokens of a financial account of the consumer, e.g., credit cards, gift cards, etc. For example, the access device routine 410 and 310 may be adapted to handle generation 411 and delivery of credit cards through one of more carriers 311. The access device routine 310 can also provide for generating and/or sending coupons 312 to the consumer as well as generating or managing checks 313, such as promotional, refund, or other checks with new cars sent to the consumer or based on the occurrence of some event related to the card such as renewal, cancellation, etc.

One of the merchant processes and/or one of the issuer processes can comprise a two-way communications process 420 and 315. The two-way communications process 420 and 315 can be adapted to manage communications with the consumer. For example, the two-way communications routine 420 and 315 can be adapted to provide an email 421 and 316, voice 422 and 317, text 423 and 318, electronic page 424 and 319, or other type of message to a consumer at a specified time or one the occurrence of some event. For example, the two-way communications routine 420 and 315 can be adapted to generate one or more emails to advertise a particular item, merchant, promotion, etc and deliver the emails to specified consumers. Additionally or alternatively, the merchant processes can also include merchant specific processes 415 such as discounting 416, fraud monitoring 417, etc.

The system 400 can also include an Item Level Processing (ILP) process 325, a broker process 330, and an e-messenger process 335 as described above. The ILP process 325 can be adapted to manage actions related to individual goods or services purchased by the consumer. The broker process 330 can be adapted to manage communications between a third-party advertiser and the consumer. The e-messenger process 335 can be adapted to manage generation and delivery of electronic statements of financial transactions for the consumer.

The system 400 can also comprise a plurality of data stores 320 communicatively coupled with the communications network. The plurality of data stores 320 can include, for example, a data link data store 321. The data link data store 321 can have stored therein information related to the consumer and/or the transaction and used by one or more of the routines to handle different aspects of the transaction. Additionally or alternatively, the plurality of data stores 320 can include an operational data store 322. The operational data store 322 can have stored therein information related to activity on one or more financial accounts of the consumer. In another example, the plurality of data stores 320 can include a marketing data store 323. The marketing data store 323 can have stored therein marketing information from the issuing financial institution. Additionally or alternatively, the plurality of data stores 320 can include a third-party data store 324. The third-party data store 324 can have stored therein marketing information provided by one or more third-party advertisers. In yet another example, the plurality of data stores 320 can include a merchant masterfile data store 425. The merchant masterfile data store 425 can have stored therein information related to details of the transaction such as a SKU number of an item purchased, the price, etc.

An integrated communications engine 320 can be adapted to manage communications between the plurality of routines 305-315, 405-420, and 325-335 to manage interactions with the consumer throughout a lifecycle of a financial relationship with the consumer. So, for example, through the integrated communication engine 320, the system 400 can coordinate the communications of the strategic communications routine 305 with those of the two-way communications routine 315 and/or broker routine 330 to provide more effective, coordinated marketing or advertising based on the occurrence of some event related to a consumer's transactions. For example, in the event that the consumer purchases a particular good, advertisements for a complimentary good can be generated and send to the consumer.

According to one embodiment, the integrated communications engine 320 can further comprise a rules engine 342. The rules engine 342 can be adapted to monitor the plurality of routines 305-315, 405-420, and 325-335, determine whether a condition specified in a rule is satisfied, and in response to determining that the condition is satisfied, trigger an action by one or more of the routines of the plurality of routines 305-315, 405-420, and 325-335 based on the rule. More specifically, the rules engine 342 can be adapted to maintain a rule base such as rule base 155 discussed above with reference to FIG. 1. As noted above, the rule base can comprise a series of rules made up of sets of conditions and corresponding actions. For example, a rule may specify that, upon the purchase of a particular good, a specific advertisement should be included in the consumer's next statement by the strategic communications routine 305 and an email should be generated and sent to the consumer by the two-way communications routine 315.

Additionally or alternatively, the integrated communications engine 320 can further comprise an Application Program Interface (API) 341. The API 341 can provide for interaction between the integrated communications engine 320 and the plurality of routines 305-315, 405-420, and 325-335. For example, the API 320 can provide a number of methods, i.e., routines, that's can be used by the integrated communications engine to monitor the plurality of routines 305-315, 405-420, and 325-335, trigger an action or actions by the routines 305-315, 405-420, and 325-335 or receive information from the routines 305-315, 405-420, and 325-335.

Figure 5:
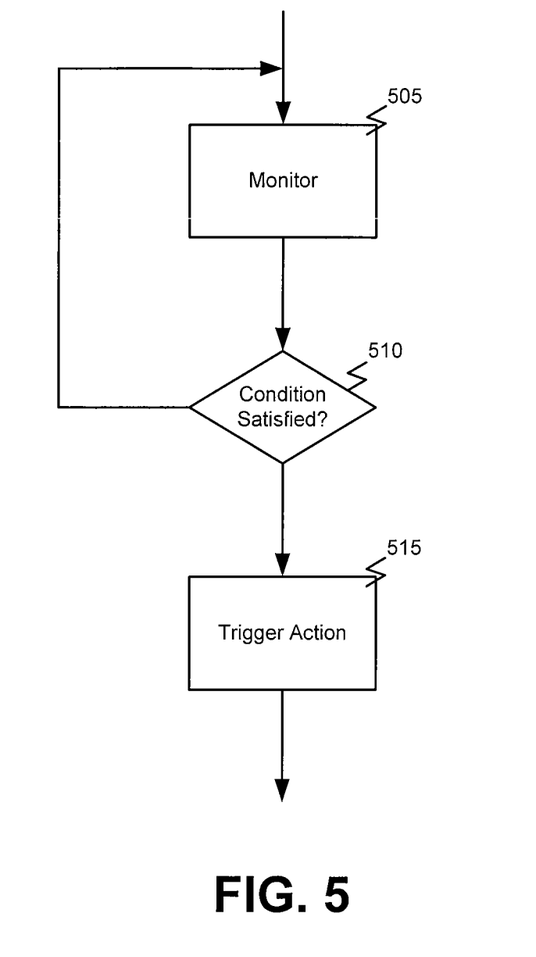
FIG. 5 is a flowchart illustrating a process for providing integrated communications between multiple systems and/or processes related to different aspects of financial transactions of a consumer according to one embodiment of the present invention.

FIG. 5 is a flowchart illustrating a process for providing integrated communications between multiple systems and/or processes related to different aspects of financial transactions of a consumer according to one embodiment of the present invention. In this example, processing begins with monitoring 505 a plurality of processes for managing different aspects of financial transactions of the consumer related to the one or more accounts. For example, the plurality of processes can comprise a strategic communications process. The strategic communications process can be adapted to manage correspondences to the consumer during generation of letters, statements of financial transactions for the consumer, etc. In another example, the plurality of processes can comprise a plastics process. The plastics process can be adapted to manage processing of physical tokens of a financial account of the consumer. Additionally or alternatively, the plurality of processes can comprise a two-way communications process. The two-way communications process can be adapted to manage communications with the consumer. In yet another example, the plurality of processes can comprise an Item Level Processing (ILP) process. The ILP process can be adapted to manage actions related to individual goods or services purchased by the consumer. Additionally or alternatively, the plurality of processes can comprise a broker process. The broker process can be adapted to manage communications between a third-party advertiser and the consumer. In still another example, the plurality of processes can comprise an e-messenger process. The e-messenger process can be adapted to manage generation and delivery of electronic statements of financial transactions for the consumer.

A determination 510 can be made as to whether a condition specified in a rule is satisfied by at least a first process of the plurality of processes. In response to determining 510 that the condition is satisfied, a second process of the plurality of processes can be triggered 515 to perform an action specified by the rule. According to one embodiment, determining whether the condition is satisfied can be further based on information stored in one or more of a plurality of data stores. For example, the plurality of data stores can include a data link data store. The data link data store can have stored therein information related to the consumer and/or the transaction and used by one or more of the routines to handle different aspects of the transaction. In another example, the plurality of data stores can include an operational data store. The operational data store can have stored therein information related to activity on one or more financial accounts of the consumer. Additionally or alternatively, the plurality of data stores can include a marketing data store. The marketing data store can have stored therein marketing information from a financial institution maintaining one or more financial accounts for the consumer. In yet another example, the plurality of data stores can include a third-party data store. The third-party data store can have stored therein marketing information provided by one or more third-party advertisers. In still another example, the plurality of data stores includes a merchant masterfile data store. The merchant masterfile data store can have stored therein information related to details of the transaction such as a SKU number of an item purchased, the price, etc.

In the foregoing description, for the purposes of illustration, methods were described in a particular order. It should be appreciated that in alternate embodiments, the methods may be performed in a different order than that described. Additionally, the methods may contain additional or fewer steps than described above. It should also be appreciated that the methods described above may be performed by hardware components or may be embodied in sequences of machine-executable instructions, which may be used to cause a machine, such as a general-purpose or special-purpose processor or logic circuits programmed with the instructions, to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A system comprising:
   one or more computers communicatively coupled with a communications network, wherein:
      the one or more computers are operated by a service provider,
      the one or more computers execute a plurality of routines, and the plurality of routines comprises:
processing a plurality of financial transactions of a consumer with a plurality of merchants for a financial institution, wherein:
the consumer has a financial account with the financial institution and the financial institution is different from the service provider and the consumer, and
the plurality of merchants is different from the service provider, the consumer, and the financial institution,
a strategic communications routine that manages correspondences to the consumer during generation of a statement of the financial account of the consumer,
an access device routine that manages processing of a payment card used by the consumer in the plurality of financial transactions, and
a broker routine that manages communications between a third-party advertiser and the consumer, wherein the third-party advertiser is different from the service provider, the consumer, the financial institution, and the plurality of merchants; and
an integrated communications engine comprising one or more processors communicatively coupled with the communications network, wherein the integrated communications engine:
monitors the plurality of routines to determine that the consumer has engaged in a cancellation of the payment card,
manages communications between the plurality of routines to generate a promotional check with a monetary value based on the cancellation of the payment card,
monitors the plurality of the financial transactions of the consumer with the plurality of merchants for a purchase of a particular good, and
manages correspondence to the consumer to include an advertisement from the third-party advertiser with the statement of the financial account based on the purchase of the particular good.

2. The system of claim 1, wherein the plurality of routines comprises a two-way communications routine, the two-way communications routine managing communications between the consumer and financial institution.

3. The system of claim 2, wherein the plurality of routines comprises an Item Level Processing (ILP) routine, the ILP routine managing actions related to individual goods or services purchased by the consumer.

4. The system of claim 1, wherein the plurality of routines comprises an e-messenger routine, the e-messenger routine managing generation and delivery of electronic statements of financial transactions for the consumer.

5. The system of claim 1, further comprising a plurality of data stores communicatively coupled with the communications network.

6. The system of claim 5, wherein the plurality of data stores includes a data link data store, the data link data store having stored therein information related to the consumer and the plurality of financial transactions by one or more of the routines for handling different aspects of the plurality of financial transactions.

7. The system of claim 6, wherein the plurality of data stores includes an operational data store, the operational data store having stored therein information related to activity on one or more financial accounts of the consumer.

8. The system of claim 7, wherein the plurality of data stores includes a marketing data store, the marketing data store having stored therein marketing information from a financial institution maintaining one or more financial accounts for the consumer.

9. The system of claim 8, wherein the plurality of data stores includes a third-party data store, the third-party data store having stored therein marketing information provided by the third-party advertisers.

10. The system of claim 9, wherein the plurality of data stores includes a merchant masterfile data store, the merchant masterfile data store having stored therein information related to details of the plurality of financial transactions.

11. The system of claim 1, wherein the integrated communications engine further comprises an Application Program Interface (API), the API providing for interaction between the integrated communications engine and the plurality of routines.

12. A system comprising:
a first set of computers communicatively coupled with a communications network, wherein:
the first set of computers are operated by a merchant that is party to a financial transaction of a consumer,
the first set of computers execute a plurality of merchant processes,
each merchant process of the plurality of merchant processes processing aspects of the financial transaction of the consumer on behalf of the merchant;
a second set of computers communicatively coupled with the communications network, wherein:
the second set of computers are operated by an issuing financial institution,
the issuing financial institution is different from the merchant and the consumer, and
the second set of computers execute a plurality of issuer processes, each issuer process of the plurality of issuer processes processing aspects of the financial transaction of the consumer on behalf of the issuing financial institution of a payment card used by the consumer in the financial transaction;
a plurality of data stores communicatively coupled with the communications network; and
an integrated communications engine, operated by a service provider, comprising one or more processors communicatively coupled with the communications network, wherein:
the service provider is different from the merchant, the consumer, and the issuing financial institution,
the integrated communications engine manages communications between a third-party advertiser and the consumer,
the third-party advertiser is different from the service provider, the consumer, the merchant, and the financial institution
the integrated communications engine determines the consumer cancelled the payment card, and
the integrated communications engine manages communications with the consumer and generates a promotional check with a monetary value to send to the consumer based on the cancellation of the payment card.

13. The system of claim 12, wherein at least one of the merchant processes and the issuer processes comprises a strategic communications process, the strategic communications process managing correspondences to the consumer during generation of a statement of financial transactions for the consumer on an account of the issuing financial institution associated with the instrument.

14. The system of claim 13, wherein at least one of the merchant processes and the issuer processes comprises a plastics process, the plastics process managing processing of physical tokens of the financial account of the consumer with the issuing financial institution associated with the instrument.

15. The system of claim 14, wherein at least one of the merchant processes and the issuer processes comprises a two-way communications process, the two-way communications process managing communications between the consumer and issuing financial institution.

16. The system of claim 15, wherein at least one of the merchant processes and the issuer processes comprises an Item Level Processing (ILP) process, the ILP process managing actions related to individual goods or services purchased by the consumer.

17. The system of claim 16, wherein at least one of the merchant processes and the issuer processes comprises a broker process, the broker process managing communications between the third-party advertiser and the consumer.

18. The system of claim 17, wherein at least one of the merchant processes and the issuer processes comprises an e-messenger process, the e-messenger process managing generation and delivery of electronic statements of financial transactions for the consumer.

19. The system of claim 12, wherein the plurality of data stores includes a data link data store, the data link data store having stored therein information related to the consumer and the transaction by one or more of the routines for handling different aspects of the transaction.

20. The system of claim 19, wherein the plurality of data stores includes an operational data store, the operational data store having stored therein information related to activity on one or more financial accounts of the consumer.

21. The system of claim 20, wherein the plurality of data stores includes a marketing data store, the marketing data store having stored therein marketing information from the issuing financial institution.

22. The system of claim 21, wherein the plurality of data stores includes a third-party data store, the third-party data store having stored therein marketing information provided by the third-party advertiser or a second third-party advertiser.

23. The system of claim 22, wherein the plurality of data stores includes a merchant masterfile data store, the merchant masterfile data store having stored therein information related to details of the financial transaction.

24. The system of claim 18, wherein the integrated communications engine further comprises a rules engine, the rules engine monitoring the plurality of merchant processes and the plurality of issuer processes, determining whether a condition specified in a rule is satisfied, and in response to determining that the condition if satisfied, triggering an action by one or more of the merchant processes or one or more of the issuer processes based one the rule.

25. The system of claim 12, wherein the integrated communications engine further comprises an Application Program Interface (API), the API providing for interaction between the integrated communications engine, the plurality of merchant processes and the plurality of issuer processes.

26. A system comprising:
one or more computers communicatively coupled with a communications network, wherein:
the one or more computers are operated by a service provider,
the one or more computers execute a plurality of routines, and
the plurality of routines comprises:
processing a plurality of financial transactions of a consumer with a plurality of merchants for a financial institution, wherein:
the consumer has a financial account with the financial institution and the financial institution is different from the service provider and the consumer, and
the plurality of merchants are different from the service provider, the consumer, and the financial institution,
a strategic communications routine that manages correspondences to the consumer during generation of a statement of the financial account of the consumer,
an access device routine that manages processing of a payment card used by the consumer in the plurality of financial transactions, and
a broker routine that manages communications between a third-party advertiser and the consumer, wherein the third-party advertiser is different from the service provider, the consumer, the financial institution, and the plurality of merchants; and
an integrated communications engine comprising one or more processors communicatively coupled with the communications network, wherein the integrated communications engine:
monitors the plurality of routines for an occurrence of a cancellation of the payment card,
determines that the occurrence of the cancellation of the payment card is satisfied, and
in response to the determines that the occurrence of the cancellation of the payment card is satisfied, generates a promotional check with a monetary value to be sent to the consumer with the statement of the financial account of the consumer.

* * * * *